United States Patent
Kabe et al.

(10) Patent No.: US 7,857,025 B2
(45) Date of Patent: Dec. 28, 2010

(54) PNEUMATIC TIRE WITH BELT LAYER INCLUDING A PLURALITY OF STRIP PIECES AND METHOD OF MANUFACTURING THE SAME

(75) Inventors: Kazuyuki Kabe, Hiratsuka (JP); Tsuneo Morikawa, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1222 days.

(21) Appl. No.: 10/580,520

(22) PCT Filed: Dec. 22, 2004

(86) PCT No.: PCT/JP2004/019176

§ 371 (c)(1),
(2), (4) Date: May 24, 2006

(87) PCT Pub. No.: WO2005/063506

PCT Pub. Date: Jul. 14, 2005

(65) Prior Publication Data

US 2007/0102090 A1     May 10, 2007

(30) Foreign Application Priority Data

Dec. 25, 2003    (JP) .............................. 2003-429318

(51) Int. Cl.
*B29D 30/38*    (2006.01)
*B29D 30/70*    (2006.01)
*B60C 9/18*     (2006.01)

(52) U.S. Cl. ................ 152/533; 152/526; 156/117; 156/130; 156/134

(58) Field of Classification Search ............... 152/526, 152/533; 156/117, 130, 134, 397
See application file for complete search history.

(56) References Cited

U.S. PATENT DOCUMENTS

| 3,682,222 | A   |   | 8/1972 | Alderfer |
|-----------|-----|---|--------|----------|
| 6,613,177 | B1  | * | 9/2003 | Suda et al. ................... 156/264 |
| 7,344,614 | B2  | * | 3/2008 | Yovichin et al. ............ 156/117 |

FOREIGN PATENT DOCUMENTS

| EP | 0 091 542 A1 | * | 10/1983 |
|----|--------------|---|---------|
| JP | 53-11723     |   | 4/1978  |
| JP | 58-187335    |   | 11/1983 |

(Continued)

*Primary Examiner*—Adrienne C Johnstone
(74) *Attorney, Agent, or Firm*—Greer, Burns & Crain, Ltd.

(57) ABSTRACT

A pneumatic tire has two belt layers, each having a plurality of strip pieces formed by pulling together and rubberizing a plurality of steel cords. Strip piece width, strip piece thickness, belt layer cord angle with respect to a tire circumferential direction, numbers of the strip pieces of inner and outer belt layers, and circumferential lengths of the inner and outer belt layers are respectively denoted by A, G, θ, $N_1$, $N_2$, $L_1$ and $L_2$. $N_2$ is equal to $N_1$, and $N_1$ is an integer satisfying $L_1 = N_1 \times A/\sin\theta$. The inner belt layer is formed by joining the $N_1$ strip pieces so each side of each strip piece is butted with one side of another strip piece. The outer belt layer is formed by aligning the $N_2$ strip pieces on the inner belt layer in the tire circumferential direction with spaces of width $2\pi G/N_2$ disposed between adjacent strip pieces.

4 Claims, 6 Drawing Sheets

FOREIGN PATENT DOCUMENTS

| | | |
|---|---|---|
| JP | 11-99564 | 4/1999 |
| JP | 2001-121622 | 5/2001 |
| JP | 2003-251711 | 9/2003 |
| JP | 2004-122727 | 4/2004 |
| JP | 2004-261965 | 9/2004 |

* cited by examiner

US 7,857,025 B2

PNEUMATIC TIRE WITH BELT LAYER INCLUDING A PLURALITY OF STRIP PIECES AND METHOD OF MANUFACTURING THE SAME

TECHNICAL FIELD

The present invention relates to a pneumatic tire provided with a belt layer composed of a plurality of strip pieces, and to a method of manufacturing the same. More specifically, the present invention relates to a pneumatic tire in which formation of a belt layer is realized by using an integer number of strip pieces and without causing any overlap between the strip pieces, and to a method of manufacturing the same.

BACKGROUND ART

In general, a belt material from which a belt layer of a pneumatic tire is molded out is obtained in a manner that, after bias cutting a calendered material formed by pulling together and rubberizing a plurality of steel cords, cut-off pieces obtained thereby are joined to one another by making cut ends of the cut-out pieces to constitute both edges of the belt layer. On the other hand, belt layers of pneumatic tires differ in belt width and in cord angle from one another depending on specifications of the tires. Therefore, it is necessary to previously prepare various belt materials whose measurements are different by tire specification.

As a result, a large stock space for stocking the various belt materials becomes necessary in a conventional tire production facility. Additionally, since a belt layer processed in accordance with a particular tire specification cannot be diverted as a belt layer for another tire specification, there is a disadvantage that the materials come to be wasted because remains of the belt materials are generated in tire production processes. In addition, there is another disadvantage that quality degradation tends to occur because the cords are exposed when the belt material is cut along the cords. Furthermore, in a case where a wide variety of products in small quantities are produced, there is still another disadvantage that productivity is inferior because, when tire specifications are changed, there is a necessity to change drums around which lengthy belt materials are rolled up.

In response to these disadvantages, there has been proposed that a belt layer having desired measurements be formed by joining the strip pieces to one another in a manner that, while the strip pieces are tilted with respect to a circumferential direction of the tire, each of both sides of each strip piece is butted with one side of another stripe piece (refer to, for example, Patent Documents 1 and 2). Each of the strip pieces is formed of a plurality of steel cords pulled together and rubberized. In this case, inconveniences attributable to lengthy belt materials different by tire specification are resolved.

However, in a case where a belt layer of a pneumatic tire is composed of multiple strip pieces, while it is desirable that widths of the respective strip pieces be constant, it is difficult to butt-join an integer number of the strip pieces, which compose the belt layer, to one another around an entire circumference of the tire. That is, when the strip pieces are aligned in a circumferential direction of the tire, it leads to any overlap between the strip pieces unless a residual part of the strip pieces is cut off in a part of the belt layer in a circumferential direction of the tire. Additionally, even if the butt-joining could have been incidentally formed in any belt layer of the pneumatic tire, any overlap between the strip pieces can be caused in a part of another belt layer in a circumferential direction of the tire because this one has a circumferential length different from that of the first mentioned belt layer. Therein, the above-described overlap between the strip pieces can be a factor in deteriorating uniformity of the tire. On the other hand, in a case where a residual part of the strip pieces is cut off in order that the butt-joining can be ensured, quality degradation tends to occur because cords are exposed in cutting the strip pieces along the cords.

[Patent Document 1] Japanese patent application Kokoku publication No. Sho53-11723

[Patent Document 2] Japanese patent application Kokai publication No. Hei11-99564

DISCLOSURE OF THE INVENTION

An object of the present invention is to provide a pneumatic tire in which formation of a belt layer is realized by using an integer number of strip pieces and without causing any overlap between the strip pieces, and a method of manufacturing the same.

A method of manufacturing a pneumatic tire according to the present invention for achieving the above object is a method of manufacturing a pneumatic tire provided with a belt layer composed of a plurality of strip pieces each of which is formed by pulling together and rubberizing a plurality of steel cords. When a width of the respective strip pieces, an applicable number of the strip pieces, a cord angle of the belt layer with respect to a circumferential direction of the tire, and a circumferential length of the belt layer are respectively denoted by A, N, $\theta$, and L, the method is characterized by including the steps of: selecting an integer satisfying $(N+1) \times A/\sin\theta > L > N \times A/\sin\theta$ as the applicable number N; and forming the belt layer by aligning these N strip pieces on a molding drum in a circumferential direction of the tire with equal spaces disposed between adjacent ones of these N strip pieces.

A pneumatic tire according to the present invention, which is manufactured by the above method, is a pneumatic tire provided with a belt layer composed of a plurality of strip pieces each of which is formed by pulling together and rubberizing a plurality of steel cords. When a width of the respective strip pieces, an applicable number of the strip pieces, a cord angle of the belt layer with respect to a circumferential direction of the tire, and a circumferential length of the belt layer are respectively denoted by A, N, $\theta$, and L, the pneumatic tire is characterized in that: an integer satisfying $(N+1) \times A/\sin\theta > L > N \times A/\sin\theta$ is selected as the applicable number N; and the belt layer is formed by aligning the N strip pieces in a circumferential direction of the tire with equal spaces disposed between adjacent ones of these N strip pieces.

Another method of manufacturing a pneumatic tire according to the present invention for achieving the above object is a method of manufacturing a pneumatic tire provided with two belt layers composed of a plurality of strip pieces each of which is formed by pulling together and rubberizing a plurality of steel cords. When a width of the respective strip pieces, a thickness of the respective strip pieces, a cord angle of the respective belt layers with respect to a circumferential direction of the tire, applicable numbers of the strip pieces composing the respective inner and outer belt layers, and circumferential lengths of the respective inner and outer belt layers are respectively denoted by A, G, $\theta$, $N_1$ and $N_2$, and $L_1$ and $L_2$, the method is characterized by including the steps of: setting the applicable number $N_2$ equal to the applicable number $N_1$ while selecting an integer satisfying $L_1 = N_1 \times A/\sin\theta$ as the applicable number $N_1$; forming the inner belt layer by joining the $N_1$ strip pieces to one another in a manner that each of both sides of each strip piece is butted with one side of another strip piece; and forming the outer belt layer by aligning the $N_2$ strip pieces on the inner belt layer in a circumferential direction of the tire with spaces, which are each equivalent to $2\pi G/N_2$, disposed between adjacent ones of these $N_2$ strip pieces.

Another pneumatic tire according to the present invention, which is manufactured by the above method, is a pneumatic tire provided with two belt layers composed of a plurality of strip pieces each of which is formed by pulling together and rubberizing a plurality of steel cords. When a width of the respective strip pieces, a thickness of the respective strip pieces, a cord angle of the respective belt layers with respect to a circumferential direction of the tire, applicable numbers of the strip pieces composing the respective inner and outer belt layers, and circumferential lengths of the respective inner and outer belt layers are respectively denoted by A, G, $\theta$, $N_1$ and $N_2$, and $L_1$ and $L_2$, the pneumatic tire is characterized in that: the applicable number $N_2$ is set equal to the applicable number $N_1$ while an integer satisfying $L_1 = N_1 \times A/\sin\theta$ is selected as the applicable number $N_1$; the inner belt layer is formed by joining the $N_1$ strip pieces to one another in a manner that each of both sides of each strip piece is butted with one side of another strip piece; and the outer belt layer is formed by aligning the $N_2$ strip pieces on the inner belt layer in a circumferential direction of the tire with spaces, which are each equivalent to $2\pi G/N_2$, disposed between adjacent ones of these $N_2$ strip pieces.

Furthermore, still another method of manufacturing a pneumatic tire according to the present invention for achieving the above object is a method of manufacturing a pneumatic tire provided with a belt layer composed of a plurality of strip pieces each of which is formed by pulling together and rubberizing a plurality of steel cords. When a width of the respective strip pieces, an applicable number of the strip pieces, a cord angle of the belt layer with respect to a circumferential direction of the tire, and a circumferential length of the belt layer are respectively denoted by A, N, $\theta$, and L, the method is characterized by including the steps of selecting an integer satisfying $(N+1) \times A/\sin\theta > L > N \times A/\sin\theta$ as the applicable number N of the strip pieces; forming an annular body by joining the N strip pieces to one another on an expandable and contractible molding drum in a manner that each of both sides of each strip piece is butted with one side of another strip piece; and thereafter forming the belt layer by elongating a circumferential length of the annular body to the length L with expansion of the molding drum in a diameter direction thereof.

Still another pneumatic tire according to the present invention, which is manufactured by the above method, is a pneumatic tire provided with a belt layer composed of a plurality of strip pieces each of which is formed by pulling together and rubberizing a plurality of steel cords. When a width of the respective strip pieces, an applicable number of the strip pieces, a cord angle of the belt layer with respect to a circumferential direction of the tire, and a circumferential length of the belt layer are respectively denoted by A, N, $\theta$, and L, the pneumatic tire is characterized in that: an integer satisfying $(N+1) \times A/\sin\theta > L > N \times A/\sin\theta$ is selected as the applicable number N; an annular body is formed by joining the N strip pieces to one another in a manner that each of both sides of each strip piece is butted to one side of another strip piece; and the belt layer is formed by elongating a circumferential length of the annular body to the length L.

Furthermore, in addition, still another method of manufacturing a pneumatic tire according to the present invention for achieving the above object is a method of manufacturing a pneumatic tire provided with two belt layers composed of a plurality of strip pieces each of which is formed by pulling together and rubberizing a plurality of steel cords. When a width of the respective strip pieces, a cord angle of the respective belt layers with respect to a circumferential direction of the tire, applicable numbers of the strip pieces composing the respective inner and outer belt layers, and circumferential lengths of the respective inner and outer belt layers are respectively denoted by A, $\theta$, $N_1$ and $N_2$, and $L_1$ and $L_2$, the method is characterized by including the steps of: setting the applicable number $N_1$ to a number satisfying a relation "$N_1 = N_2 - 1$" while selecting an integer satisfying $L_2 = N_2 \times A/\sin\theta$ as the applicable number $N_2$; forming an annular body by joining the $N_1$ strip pieces to one another on an expandable and contractible molding drum in a manner that each of both sides of each strip piece is butted with one side of another strip piece; thereafter forming the inner belt layer by elongating a circumferential length of the annular body to the length L with expansion of the molding drum in a diameter direction thereof; and subsequently forming the outer belt layer by joining the $N_2$ strip pieces to one another on the inner belt layer in a manner that each of both sides of each strip piece is butted with one side of another strip piece.

Still another pneumatic tire according to the present invention, which is manufactured by the above method, is a pneumatic tire provided with two belt layers composed of a plurality of strip pieces each of which is formed by pulling together and rubberizing a plurality of steel cords. When a width of the respective strip pieces, a cord angle of the respective belt layers with respect to a circumferential direction of the tire, applicable numbers of the strip pieces composing the respective inner and outer belt layers, and circumferential lengths of the respective inner and outer belt layers are respectively denoted by A, $\theta$, $N_1$ and $N_2$, and $L_1$ and $L_2$, the pneumatic tire is characterized in that: the applicable number $N_1$ is set to a number satisfying a relation "$N_1 = N_2 - 1$" while an integer satisfying $L_2 = N_2 \times A/\sin\theta$ is selected as the applicable number $N_2$; an annular body is formed by joining the $N_1$ strip pieces to one another in a manner that each of both sides of each strip piece is butted with one side of another strip piece; the inner belt layer is formed by elongating a circumferential length of the annular body to the length L; and the outer belt layer is formed by joining the $N_2$ strip pieces to one another on the inner belt layer in a manner that each of both sides of each strip piece is butted with one side of another strip piece.

In the present invention, when a belt layer is formed, an integer number of strip pieces are arranged to be able to fit a circumferential length of the belt layer. Therefore, the belt layer can be formed by using the integer number of strip pieces and without causing any overlap between the strip pieces. Additionally, since it is unnecessary to cut off a residual part of the strip pieces along cords thereof, quality degradation otherwise resulting from exposure of cords can be avoided.

According to the present invention, it is possible to make the most of advantages available in a case where a belt layer is composed of strip pieces. That is, when tire sizes are changed, it is possible to form various belt layers by using the strip pieces of the same width. Tilt angles, lengths and applicable numbers of the strip pieces are changed in response to various sizes. Accordingly, stock spaces for different tire specifications are saved, discarded materials are not generated, and furthermore, a large-scale changeover operation is made unnecessary. As a result, it becomes possible to efficiently produce a wide variety of products in small quantities.

BEST MODE FOR CARRYING OUT THE INVENTION

Hereinbelow, detailed descriptions will be given of configurations of the present invention with reference to the accompanying drawings.

Figure 1:
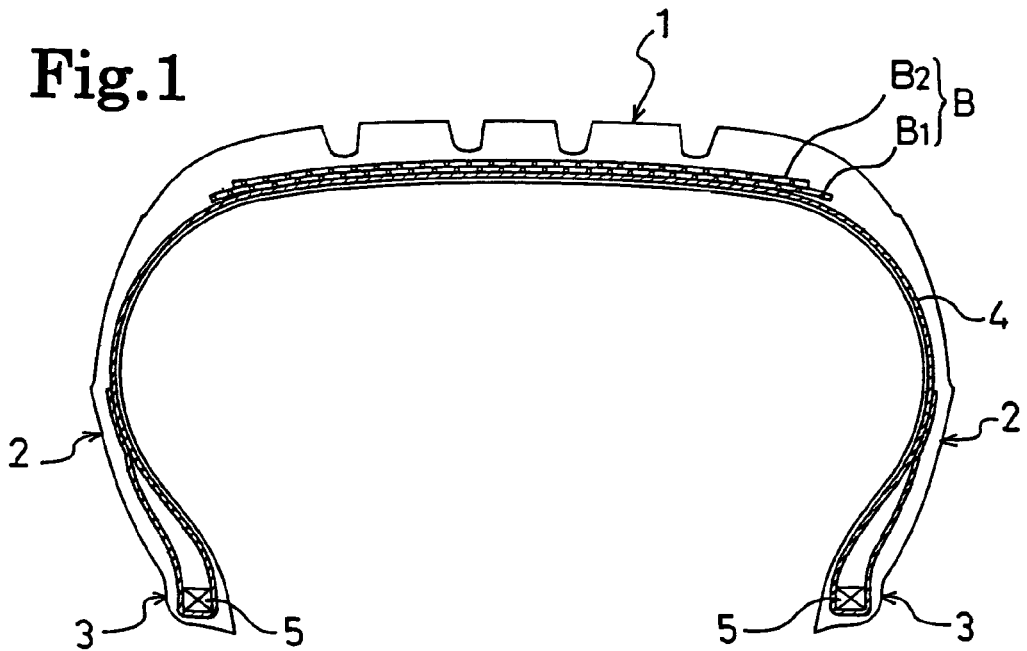
FIG. 1 is a cross-sectional view showing an example of pneumatic tires obtained by a method of manufacturing a pneumatic tire according to the present invention, the cross-sectional view being taken along a meridian of the tire.
Figure 2:
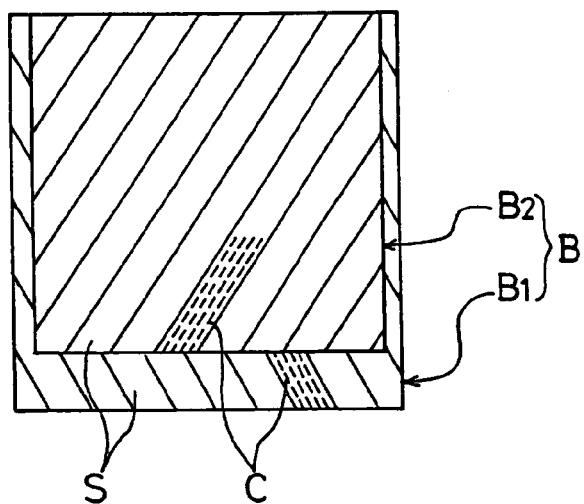
FIG. 2 is a plan view showing a belt layer of the pneumatic tire in FIG. 1 by extracting the belt layer.
Figure 3:
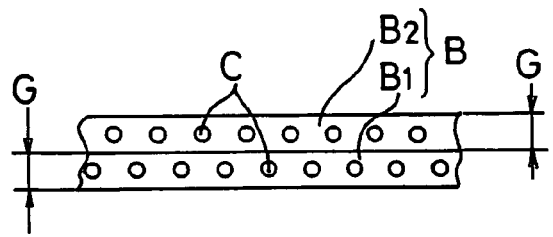
FIG. 3 is a cross-sectional view showing the belt layer of the pneumatic tire in FIG. 1 by extracting the belt layer.

FIG. 1 shows an example of pneumatic tires obtained by a method of manufacturing a pneumatic tire according to the present invention, and FIGS. 2 and 3 show a belt layer thereof by extracting the belt layer. In FIG. 1, reference numerals 1, 2 and 3 denote a tread portion, a sidewall portion and a bead portion respectively.

As shown in FIG. 1, a carcass layer 4 is provided between a pair of the left and right bead portions 3, 3 so as to bridge the bead portions. The carcass layer 4 is turned up around a bead core 5 buried in each of the bead portions 3, 3 from an inside to an outside of the tire. On the other hand, two belt layers B ($B_1$ and $B_2$), each formed by pulling together and rubberizing a plurality of steel cords, are buried to an outer periphery of the carcass layer 4 in the tread portion 1 in a manner that the belt layers overlap each other.

As shown in FIGS. 2 and 3, an entire portion of each of the belt layers B, which corresponds to one circumference of the tire, is constituted in the following manner. While an integer number of strip pieces S each formed by pulling together and rubberizing a plurality of steel cords C are tilted with respect to a circumferential direction of the tire, these strip pieces S are joined to one another in a manner that each of both sides of each strip piece S is butted with one side of another strip piece S. That is, the strip pieces S are butt-joined to one another around an entire circumference of the tire. These belt layers B are arranged in a manner that steel cords C of one belt layer B are crossed with respect to those of the other belt layer B.

Figure 4:
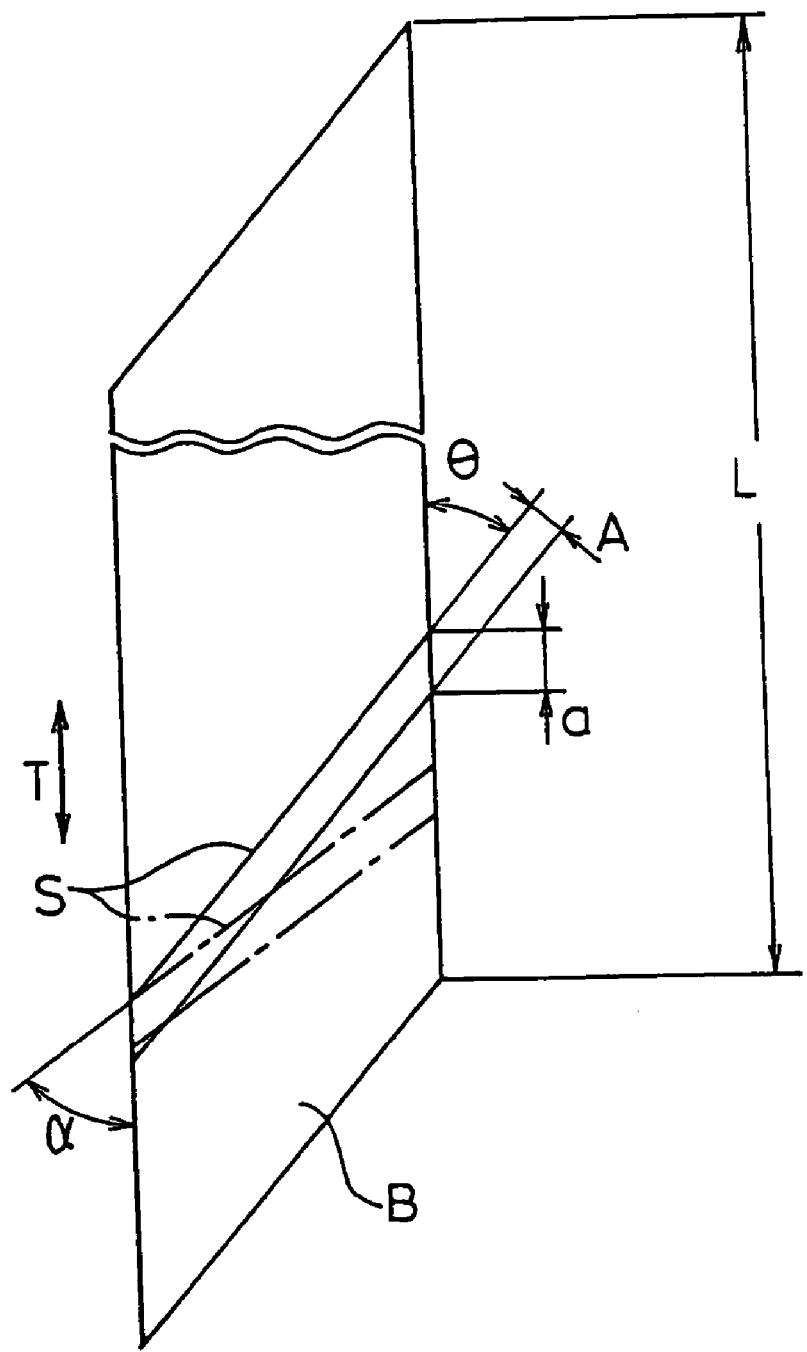
FIG. 4 is an illustration showing a method of designing the belt layer of the pneumatic tire in FIG. 1.

Next, a description will be given of a method of designing a belt layer of the abovementioned pneumatic tire. FIG. 4 shows the method of designing the belt layer. Here, a width of the respective strip pieces S, an applicable number of the strip pieces S, a cord angle of each of the belt layers B with respect to a circumferential direction of the tire, and a circumferential length of the each belt layer B are respectively denoted by A, N, θ and L. In forming the each belt layer B, as shown in FIG. 4, an entire portion, which corresponds to one circumference of the tire, of the each belt layer B is formed in the following manner. While the integer number of strip pieces S are tilted with respect to a circumferential direction T of the tire, these strip pieces S are joined to one another in a manner that each of both sides of each strip piece S is butted with one side of another strip piece S. At this point, when a length component of each of the strip pieces S in the tire circumferential direction is denoted by a, a relation "a=A/sin θ" holds true. Additionally, since the applicable number of the strip pieces S is N, a relation "L=N×a" is obtained. If these relations are rearranged, the following equation (1) can be obtained.

$$\theta = \sin^{-1}(N \times A/L) \quad (1)$$

That is, in order to butt-joining the integer number of strip pieces S to one another around the entire circumference of the tire, it is necessary that the cord angle θ of the belt layer B should satisfy a relation of the abovementioned equation (1). Here, if a basic design value α for a cord angle of the each belt layer B with respect to a circumferential direction of the tire T does not match the cord angle θ required for the butt-joining, it is necessary that the relation of the abovementioned equation (1) should be attained by fine-tuning, from the basic design value α, a tilt angle of the strip pieces S with respect to a circumferential direction of the tire T.

However, it is desirable that a difference between the basic design value α and the cord angle θ be not more than 0.5°. When this difference exceeds 0.5°, predetermined performance of the pneumatic tire is affected. In FIG. 4, although the difference between the basic design value α and the cord angle θ appears to be notable, the difference in angle is illustrated excessively large for the purpose of facilitating understanding of a relation between the cord angle and the basic design value.

In the pneumatic tire provided with the two belt layers B, the circumferential lengths L of the respective belt layers B are different from each other due to the thickness G of each piece of the strip material S. Accordingly, in the abovementioned method, it is difficult to match the cord angles θ of the two belt layers B with each other while forming the belt layers B by using the integer number of the strip pieces S and without causing any overlap between the strip pieces. In response, in forming the belt layers B by using the integer number of the strip pieces S and without causing any overlap between the strip pieces, the following manufacturing method is carried out in the present invention.

Figure 5:
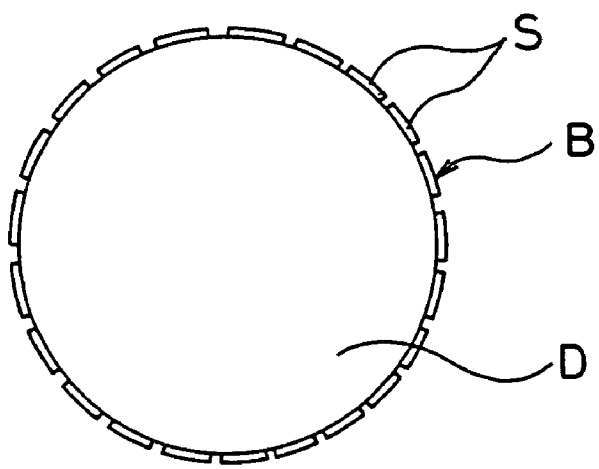
FIG. 5 is an illustration showing pieces of a strip material on a molding drum in a first method of manufacturing a pneumatic tire according to the present invention.
Figure 6:
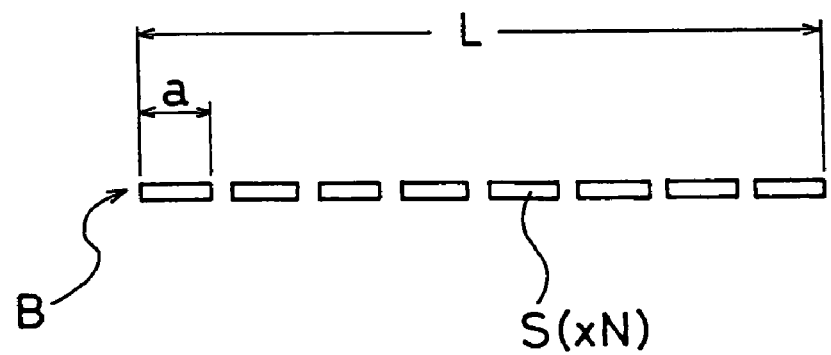
FIG. 6 is an illustration showing measurements of the pieces of the strip material in the first method of manufacturing a pneumatic tire according to the present invention.

FIGS. 5 and 6 are for illustrating a first method of manufacturing a pneumatic tire according to the present invention. That is, when a width of the respective strip pieces S, an applicable number of the strip pieces S, a cord angle of each of the belt layers B with respect a circumferential direction of the tire, and a circumferential length of the each belt layer B are respectively denoted by A, N, θ and L, the each belt layer B is formed in the following processes. First, an integer satisfying $(N+1) \times A/\sin\theta > L > N \times A/\sin\theta$ is selected as the applicable number N. Then, as shown in FIGS. 5 and 6, the each belt layer B is completely formed by aligning the N strip pieces S on a molding drum D in a circumferential direction of the tire with equal spaces disposed between adjacent ones of the N strip pieces S.

In this case, the N strip pieces S are aligned with minute spaces, which are obtained by divining a difference between the circumferential length L and a value for $N \times A/\sin\theta$ into N equal parts, disposed between adjacent ones of the N strip pieces S. In this process each belt layer B can be formed by using the integer number of the strip pieces S and without causing any overlap between the strip pieces.

Figure 7:
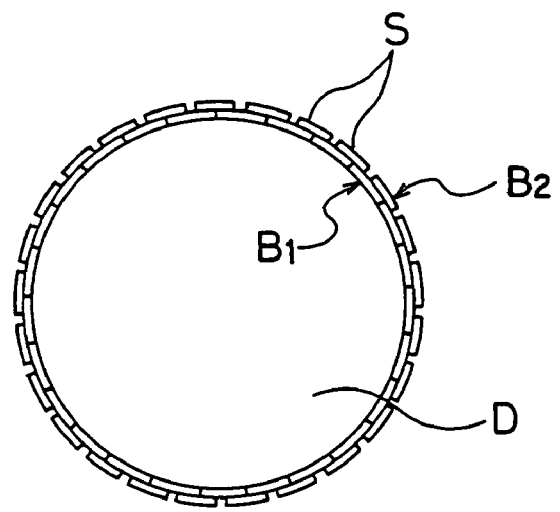
FIG. 7 is an illustration showing pieces of a strip material on a molding drum in a second method of manufacturing a pneumatic tire according to the present invention.
Figure 8:
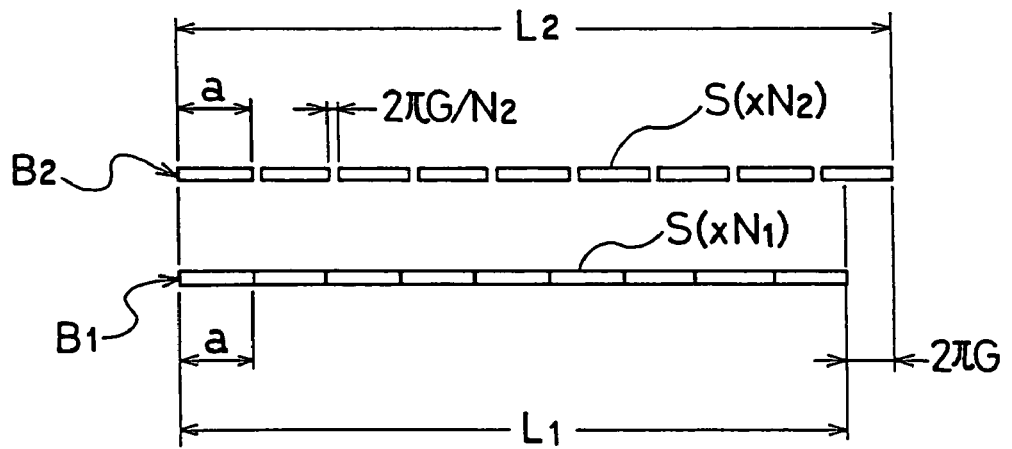
FIG. 8 is an illustration showing measurements of the pieces of the strip material in the second method of manufacturing a pneumatic tire according to the present invention.

FIGS. 7 and 8 are for illustrating a second method of manufacturing a pneumatic tire according to the present invention. The second manufacturing method is a more specified one of the first manufacturing method. That is, when a width of the respective strip pieces S, a thickness of the respective strip pieces S, a cord angle of the respective belt layers $B_1$ and $B_2$ with respect to a circumferential direction of the tire, applicable numbers of the strip pieces composing the respective inner and outer belt layers $B_1$ and $B_2$, and circumferential lengths of the respective inner and outer belt layers $B_1$ and $B_2$ are respectively denoted by A, G, θ, $N_1$ and $N_2$, and $L_1$ and $L_2$, the inner and outer belt layers $B_1$ and $B_2$ are formed in the following processes. First, the applicable number $N_2$ is set equal to the applicable number $N_1$ while an integer satisfying $L_1 = N_1 \times A/\sin\theta$ is selected as the applicable number $N_1$. Then, as shown in FIGS. 7 and 8, the inner belt layer $B_1$ is formed by joining the $N_1$ strip pieces to one another on the molding drum D in a manner that each of both sides of each strip piece is butted with one side of another strip piece. Subsequently, the outer belt layer $B_2$ is completely formed by aligning the $N_2$ strip pieces on the inner belt layer $B_1$ in a circumferential direction of the tire with spaces, which are each equivalent to $2\pi G/N_2$, disposed between adjacent ones of these $N_2$ strip pieces.

In this case, in the outer belt layer $B_2$, the $N_2$ strip pieces S are aligned with minute spaces, which are each equivalent to $2\pi G/N_2$, disposed between adjacent ones of the $N_2$ strip pieces S. In this process, the respective belt layers $B_1$ and $B_2$ can be formed by using the integer numbers of the strip pieces S and without causing any overlap between the strip pieces. Moreover, the inner and outer belt layers $B_1$ and $B_2$ can have the same cord angle θ.

Figure 9:
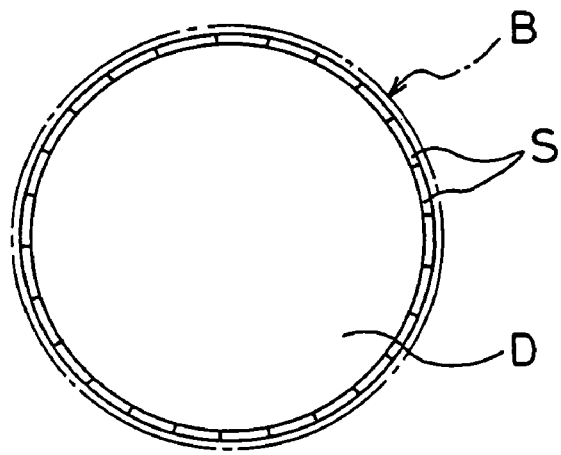
FIG. 9 is an illustration showing pieces of a strip material on a molding drum in a third method of manufacturing a pneumatic tire according to the present invention.
Figure 10:
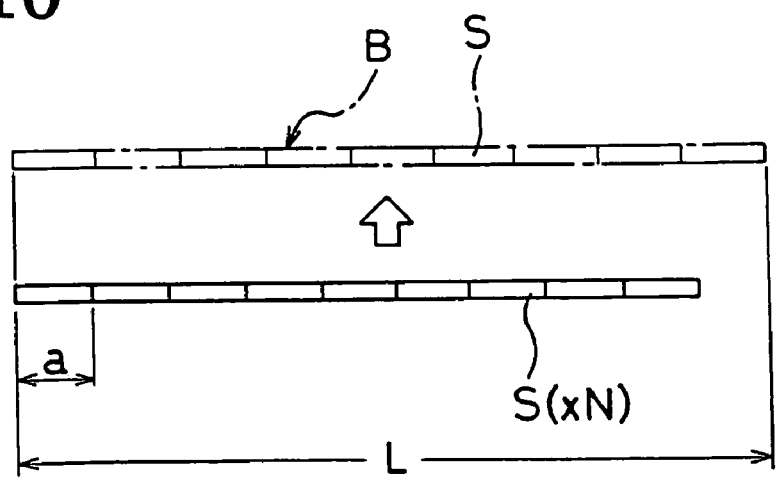
FIG. 10 is an illustration showing measurements of the pieces of the strip material in the third method of manufacturing a pneumatic tire according to the present invention.

FIGS. 9 and 10 are for illustrating a third method of manufacturing a pneumatic tire according to the present invention. That is, when a width of the respective strip pieces S, an applicable number of the strip pieces S, a cord angle of each of the belt layers B with respect to a circumferential direction of the tire, and a circumferential length of the each belt layer B are respectively denoted by A, N, θ, and L, the each belt layer B is formed in the following processes. First, an integer satisfying $(N+1) \times A/\sin\theta > L > N \times A/\sin\theta$ is selected as the applicable number N. Then, as shown in FIGS. 9 and 10, an annular body is formed by joining the N strip pieces to one another on the expandable and contractible molding drum D in a manner that each of both sides of each strip piece is butted with one side of another strip piece. The belt layer B is formed by elongating a circumferential length of the annular body to the length L with expansion of the molding drum D in the diameter direction.

In this case, the N strip pieces S are aligned in a state where the N strip pieces S are elongated in a circumferential direction of the tire to abut one another. In this process, the each belt layer B can be formed by using the integer number of the strip pieces S and without causing any overlap between the strip pieces.

Figure 11:
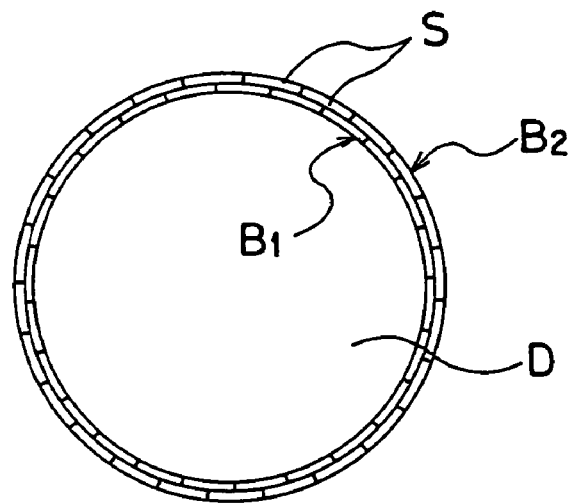
FIG. 11 is an illustration showing pieces of a strip material on a molding drum in a fourth method of manufacturing a pneumatic tire according to the present invention.
Figure 12:
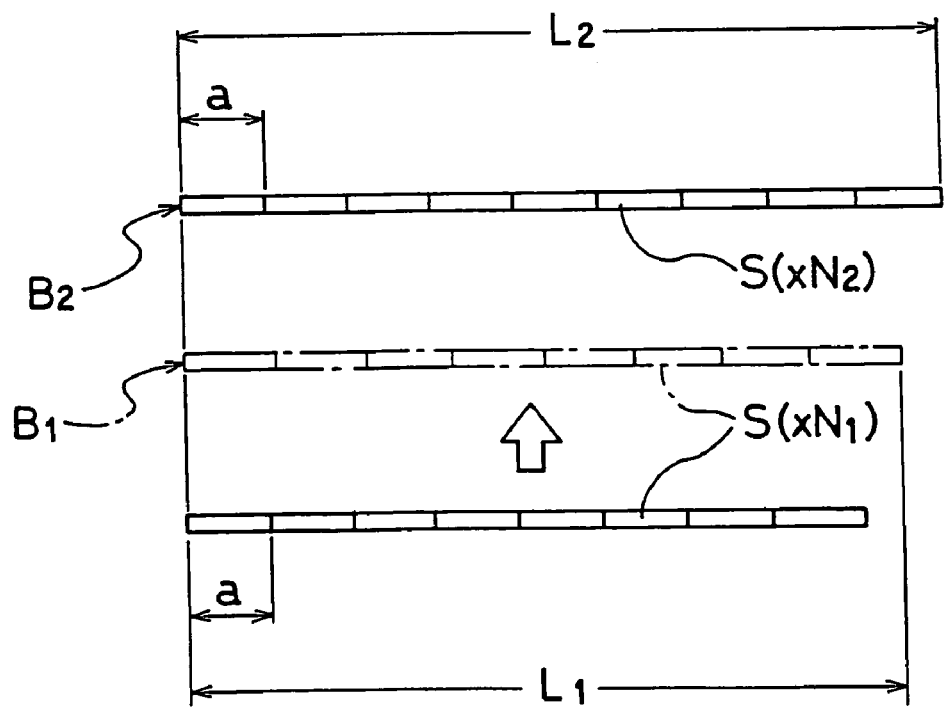
FIG. 12 is an illustration showing measurements of the pieces of the strip material in the fourth method of manufacturing a pneumatic tire according to the present invention.

FIGS. 11 and 12 are for illustrating a fourth method of manufacturing a pneumatic tire according to the present invention. The fourth manufacturing method is a more specified one of the third manufacturing method. That is, when a width of the respective strip pieces S, a cord angle of the respective belt layers $B_1$ and $B_2$ with respect to a circumferential direction of the tire, applicable numbers of the strip pieces S composing the respective inner and outer belt layers $B_1$ and $B_2$, and circumferential lengths of the respective inner and outer belt layers $B_1$ and $B_2$ are respectively denoted by A, θ, $N_1$ and $N_2$, and $L_1$ and $L_2$, the inner and outer belt layers $B_1$ and $B_2$ are formed in the following processes. First, the applicable number $N_1$ is set to a number satisfying a relation "$N_1 = N_2 - 1$" while an integer satisfying $L_2 = N_2 \times A/\sin\theta$ is selected as the applicable number $N_2$. Then, as shown in FIGS. 11 and 12, an annular body is formed by joining the $N_1$ strip pieces S to one another on the expandable and contractible molding drum D in a manner that each of both sides of each strip piece is butted with one side of another strip piece. Thereafter, the inner belt layer $B_1$ is formed by elongating a circumferential length of the annular body to the length $L_1$ with expansion of the molding drum D in the diameter direction. Subsequently, the outer belt layer $B_2$ is formed by joining the $N_2$ strip pieces S to one another on the inner belt layer $B_1$ in a manner that each of both sides of each strip piece is butted with one side of another strip piece.

In this case, in the inner belt layer $B_1$, the $N_1$ strip pieces S are aligned in a state where the $N_1$ strip pieces S are elongated in a circumferential direction of the tire to abut one another. In this process, the respective belt layers $B_1$ and $B_2$ can be formed by using the integer numbers of the strip pieces S and without causing any overlap between the strip pieces. Moreover, the inner and outer belt layers $B_1$ and $B_2$ can have the same cord angle θ.

Next, a description will be given of calculation procedures when pneumatic tires are actually manufactured. Examples 1 and 2 are each an application of the present invention to a pneumatic tire for a passenger automobile, the pneumatic tire having a cord angle and a maximum radium r of belt layers respectively set to 20° and 270 mm as basic design values.

Example 1

In a pneumatic tire (175/65R14) for a passenger automobile, a width A of each of common strip pieces, a thickness G of each of belt layers, circumferential lengths $L_1$ and $L_2$ of the respective inner and outer belt layers, and basic design values $\alpha_1$ and $\alpha_2$ for cord angles of the respective inner and outer belt layers are respectively set to, for example, $2\pi$ mm, 2 mm, $2\pi \times 268$ mm and $2\pi \times 270$ mm, and 20° and 20°.

First, an applicable number $N_1$ of the strip pieces S composing the inner belt layer is obtained. Based on $\alpha_1 = \sin^{-1}(N_1 \times A/L_1)$, $N_1 = 91.66$ is obtained. Here, in order to satisfy a condition that the applicable number $N_1$ should be an integer, $N_1$ is rounded up to, for example, 92. Accordingly, based on $\theta_1 = \sin^{-1}([92 \times 2\pi]/[2\pi \times 268])$, $\theta_1$ nearly equals 20.07°. This cord angle $\theta_1$ has only a slight error from the basic design value $\alpha_1$.

On the other hand, with respect to the outer belt layer, an applicable number $N_2$ is set equal to the applicable number $N_1$, and a space between each two adjacent ones of the strip pieces S is found based on $2\pi G/N_2$. In this case, the space becomes 0.137 mm. Then, after the inner belt layer is formed on a molding drum based on the abovementioned measurements, the outer belt layer is formed by aligning the $N_2$ strip pieces S in a circumferential direction of the tire with spaces of 0.137 mm disposed between adjacent ones of the strip pieces S.

In this process, when the two belt layers are formed by using the common strip pieces S, the two belt layers can be manufactured while the cord angles $\theta_1$ and $\theta_2$ of the respective inner and outer belt layers are approximated to the basic design values thereof at the same angle ($\theta_1=\theta_2$), that is, without harming tire characteristics.

Example 2

In a pneumatic tire (175/65R14) for a passenger automobile, a width A of each of common strip pieces, a thickness G of each of belt layers, circumferential lengths $L_1$ and $L_2$ of the inner and outer belt layers, and basic design values $\alpha_1$ and $\alpha_2$ for a cord angle of the respective belt layers are respectively set to $2\pi$ mm, 2 mm, $2\pi \times 268$ mm and $2\pi \times 270$ mm, and 20° and 20°.

First, an applicable number $N_2$ of the strip pieces S composing the outer belt layer is obtained. Based on $\alpha_2 = \sin^{-1}(N_2 \times A/L_2)$, $N_2 = 92.34$ is obtained. Here, in order to satisfy a condition that the applicable number $N_2$ should be an integer, $N_2$ is rounded up to, for example, 93. Accordingly, based on $\theta_2 = \sin^{-1}([93 \times 2\pi]/[2\pi \times 270])$, $\theta_2$ nearly equals 20.15°. This cord angle $\theta_2$ has only a slight error from the basic design value $\alpha_2$.

On the other hand, with respect to the inner belt layer, an applicable number $N_1$ is set so as to satisfy a relation "$N_1 = N_2 - 1$." Thereafter, a cord angle $\theta_1$ is set equal to the cord angle $\theta_2$, and the $N_1$ strip pieces S are joined to one another on an expandable and contractible molding drum to form an annular body. Subsequently, the inner belt layer is formed by elongating a circumferential length of the annular body to the length $L_1$ with expansion of the molding drum in the diameter direction. Then, on an outside of the inner belt layer, the outer belt layer is formed based on the above measurements.

In this process, when the two belt layers are formed by using the common strip pieces S, the strip pieces can be butt-joined to one another around an entire circumference of the tire in both of the two belt layers while the cord angles $\theta_1$ and $\theta_2$ of the respective inner and outer belt layers are both approximated to the basic design values thereof.

Examples as described above are merely for exemplification, and the present invention is not limited to abovementioned Examples. For example, it is possible to arbitrarily increase or decrease the width A of the strip pieces S. However, if the width A of the strip pieces S is made unnecessarily large, the belt layers results in having larger errors with respect to the target designs. On the other hand, when the belt layers are intended to be formed according to the target designs, it is necessary to make the width A of the respective strip pieces S narrower, and productivity is deteriorated by a resulting increase of an applicable number thereof. *Accordingly, it is preferable that the width A of the respective strip pieces S be not less than 5 mm and not more than 100 mm.*

While the detailed descriptions have been given of the preferred embodiments of the present invention hereinabove, it should be understood that various modifications to, substitutions for, and replacements with the preferred embodiments can be carried out as long as the modifications, the substitutions, and the replacements do not depart from the spirit and the scope of the present invention defined by the attached scope of claim.

What is claimed is:

1. A pneumatic tire provided with a belt layer composed of a plurality of strip pieces each of which is formed by pulling together and rubberizing a plurality of steel cords, wherein, when a width of the respective strip pieces, an applicable number of the strip pieces, a cord angle of the belt layer with respect to a circumferential direction of the tire, and a circumferential length of the belt layer are respectively denoted by A, N, $\theta$, and L: an integer satisfying $(N+1) \times A/\sin \theta > L > N \times A/\sin \theta$ is selected as the applicable number N; and the belt layer is completely formed by aligning the N strip pieces in the circumferential direction of the tire with equal spaces disposed between adjacent ones of these N strip pieces such that there is no overlap between adjacent strip pieces.

2. A pneumatic tire provided with two belt layers each comprising a plurality of strip pieces each of which is formed by pulling together and rubberizing a plurality of steel cords, wherein, when a width of the respective strip pieces, a thickness of the respective strip pieces, a cord angle of the respective belt layers with respect to a circumferential direction of the tire, applicable numbers of the strip pieces forming the respective inner and outer belt layers, and circumferential lengths of the respective inner and outer belt layers are respectively denoted by A, G, $\theta$, $N_1$ and $N_2$, and $L_1$ and $L_2$: the applicable number $N_2$ is set equal to the applicable number $N_1$ while an integer satisfying $L_1 = N_1 \times A/\sin \theta$ is selected as the applicable number $N_1$; the inner belt layer is formed by joining the $N_1$ strip pieces to one another in a manner that each of both sides of each strip piece is butted with one side of another strip piece; and the outer belt layer is completely formed by aligning the $N_2$ strip pieces on the inner belt layer in the circumferential direction of the tire with spaces, which are each equivalent to $2\pi G/N_2$, disposed between adjacent ones of these $N_2$ strip pieces such that there is no overlap between adjacent outer belt layer strip pieces.

3. A method of manufacturing a pneumatic tire provided with a belt layer composed of a plurality of strip pieces each of which is formed by pulling together and rubberizing a plurality of steel cords, when a width of the respective strip pieces, an applicable number of the strip pieces, a cord angle of the belt layer with respect to a circumferential direction of the tire, and a circumferential length of the belt layer are respectively denoted by A, N, $\theta$, and L, the method comprising the steps of:

selecting an integer satisfying $(N+1) \times A/\sin \theta > L > N \times A/\sin \theta$ as the applicable number N; and completely forming the belt layer by aligning the N strip pieces on a molding drum in the circumferential direction of the tire with equal spaces disposed between adjacent ones of these N strip pieces such that there is no overlap between adjacent strip pieces.

4. A method of manufacturing a pneumatic tire provided with two belt layers each comprising a plurality of strip pieces each of which is formed by pulling together and rubberizing a plurality of steel cords, when a width of the respective strip pieces, a thickness of the respective strip pieces, a cord angle of the respective belt layers with respect to a circumferential direction of the tire, applicable numbers of the strip pieces forming the respective inner and outer belt layers, and circumferential lengths of the respective inner and outer belt layers are respectively denoted by A, G, $\theta$, $N_1$ and $N_2$, and $L_1$ and $L_2$, the method comprising the steps of:

setting the applicable number $N_2$ equal to the applicable number $N_1$ while selecting an integer satisfying $L_1 = N_1 \times A/\sin \theta$ as the applicable number $N_1$;

forming the inner belt layer by joining the $N_1$ strip pieces to one another in a manner that each of both sides of each strip piece is butted with one side of another strip piece; and completely forming the outer belt layer by aligning the $N_2$ strip pieces on the inner belt layer in the circumferential direction of the tire with spaces, which are each equivalent to $2\pi G/N_2$, disposed between adjacent ones of these $N_2$ strip pieces such that there is no overlap between adjacent outer belt layer strip pieces.

* * * * *